Jan. 2, 1968     M. McCLENNAN     3,361,014
GUN DRILL GUIDE
Filed July 28, 1965

INVENTOR
MORTON McCLENNAN
BY Hoffmann and Yount
ATTORNEYS

United States Patent Office 3,361,014
Patented Jan. 2, 1968

3,361,014
GUN DRILL GUIDE
Morton McClennan, 19906 Van Aken Blvd.,
Shaker Heights, Ohio 44120
Filed July 28, 1965, Ser. No. 475,362
16 Claims. (Cl. 77—55)

ABSTRACT OF THE DISCLOSURE

A guide member for a gun drill which has a resilient body with an opening therein for receiving the gun drill with the opening corresponding in configuration to the drill and having normal dimensions slightly smaller than the drill.

---

The present invention relates to a whip guide assembly for supporting gun drills and the like.

Gun drills generally comprise a drill tube formed by a rod having a longitudinal V groove or flute in one side thereof and a drill head, similar in cross sectional configuration to that of the drill tube and slightly larger in diameter, is formed integral with the head end of the drill tube. This configuration provides cutting edges and a passage through which chips may be washed from the workpiece by lubricant fed into the bore through a central passage through the drill tube. One difficulty with such drills is that the groove unbalances the drill tube and it has a tendency to whip or bow at relatively high speeds and must be carefully guided to start a drilling operation and prevented from whipping during drilling. Also, the gun drill is usually employed in connection with a machine having a chip box having one wall against the face of the workpiece for receiving the chips and lubricant from the drilled work and the opposite wall having an opening through which the drill tube extends, and in the past lubricant and chips would escape from the box between the drill tube and the edges of the opening.

The principal object of the present invention is the provision of a new and improved guide assembly for a gun drill and the like which is extremely simple and is yet highly effective to guide the drill tube in starting the drilling operation and in supporting the intermediate portion of the drill so as to prevent or dampen the tendency of the drill to bow or whip whereby the drill may be operated at a relatively high r.p.m. and thereby increase drilling rate over conventionally supported drills of type mentioned.

A further object of the invention is the provision of an improved gun drill guide which serves as an effective seal between the drill and the edges of an opening of a chip box through which the drill tube extends and prevents passage of lubricant and chips from the chip box around the drill.

More particularly it is an object of the invention to provide a guide support for a gun drill and the like comprising a body of relatively plastic and resilient material, such as molded vinyl, supported about its edges in a suitable rigid support or frame and having an opening therethrough of the general configuration of the transverse cross section of the gun drill but normally slightly smaller in outline so that the gun drill can be readily inserted through the opening by deforming the body, and the resiliency of the material of the body causes it to not only snugly embrace the drill tube and provide a dampening action against tendency of the drill to bow or whip, but also forms a liquid tight seal between the drill tube and the opening through the body.

A still further object of the invention is the provision of a new and improved guide for a gun drill and the like comprising a cylindrical body of resilient plastic material adapted to be received inside the inner race of an anti-friction bearing and having an irregular central opening therethrough corresponding in form to the cross-sectional form of a gun drill whereby a gun drill may be extended therethrough, the ends of the cylindrical body having radially extending flanges, one of which provides a relatively extensive sealing surface abutting one end face of the anti-friction bearing in which the body is received and the other flange being of substantially less diameter than the first mentioned flange and forming an abutment which rormally engages the opposite end face of the bearing to retain the body inside the bearing race and which flange is deformable to permit insertion thereof through the race for installing or removing the body from the bearing.

Other objects and advantages of the invention will be apparent from the following description of the preferred form thereof, reference being made to the accompanying drawings wherein.

Figure 1:
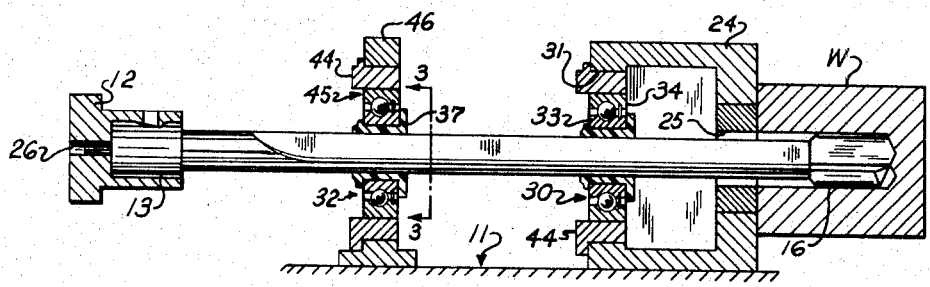
FIG. 1 is a fragmentary sectional view of a drilling machine employing a gun drill supported by a guide assembly embodying the invention.
Figure 2:
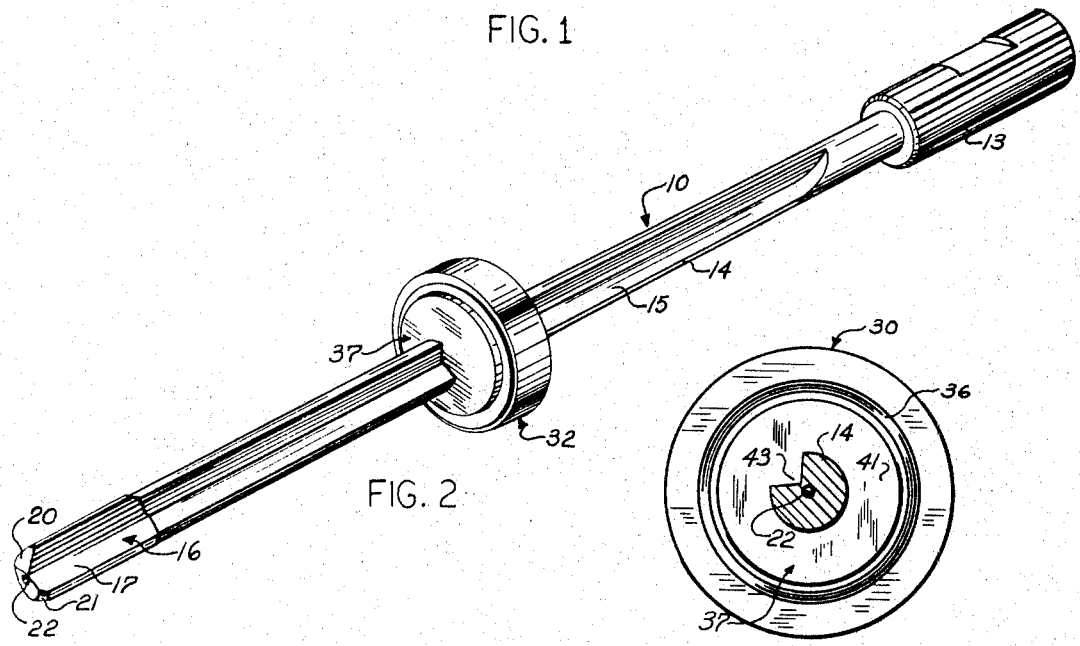
FIG. 2 is a perspective view of a gun drill inserted in the guide assembly.
Figure 3:
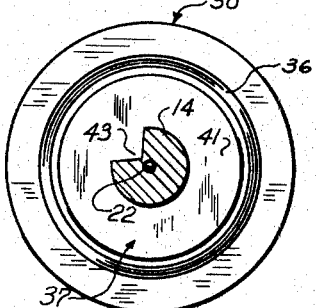
FIG. 3 is a sectional view taken substantially along line 3—3 of FIG. 1, but on a larger scale.
Figure 4:
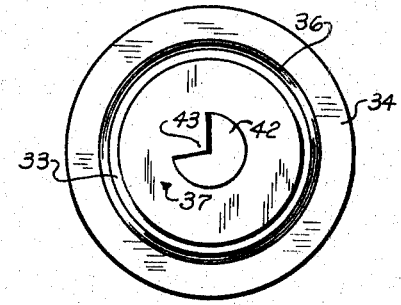
FIG. 4 is an end elevational view of the guide assembly.

In the form of the invention shown, a gun drill 10 is utilized in a machine 11 for drilling a workpiece W. The machine 11 is shown more or less schematically because such machines are well known and the details thereof are not important to the understanding of this invention. Suffice to say, the machine comprises a horizontal drill spindle 12 having a chuck thereon for receiving the shank end 13 of the gun drill in the usual manner. The spindle 12 moves toward and from the workpiece to advance the drill into the cut bore and to remove it from the workpiece, as is well understood in the art.

The gun drill comprises a rod 14 having a longitudinal V-shaped groove or flute 15 in one side thereof which terminates adjacent the shank end 13 and which has a drill head 16 at the other end, the head being generally of the same cross-sectional form as the drill rod, including a groove 17, but which is slightly larger in diameter than the diameter of the rod proper. The head 16 has cutting edges 20, 21 and as the drill cuts metal from a workpiece, the metal chips are carried outwardly of the drilled bore along the grooves 15 and 17 by lubricant pumped through an axial bore 22 through the drill tube.

As mentioned hereinbefore, the gun drill is attached in a conventional manner to the spindle 12 and extends through a chip box 24 to engage the workpiece W which is suitably secured on the machine frame. The portion of the workpiece to be drilled is aligned with an opening 25 in an end wall of the chip box which is against the workpiece so as to receive lubricant and chips from the drilled workpiece as drilling thereof progresses. A suitable lubricant is pumped through a passage 26 in spindle 12 into the bore 22 of the drill as the drill tube is rotated so as to lubricate and cool the workpiece and drill, and to wash the chips from the drilled opening. The lubricant circulating system is not shown as they are well known in the art.

It is apparent that the groove 15 in the drill rod unbalances the rod and if rotated at a relatively high r.p.m. the rod will tend to whip and bow. To prevent this undesirable action of the drill, a novel and improved drill guide assembly 30 is provided in the side of the chip box 24 opposite the wall having opening 25 therethrough, which guide not only serves to hold the drill head in proper alignment with the workpiece at the start of the drilling operation but dampens any tendency of the drill to whip, bow or vibrate as the drilling progresses. Furthermore, the guide 30 prevents escape of lubricant and metal chips from the chip box through the opening 31 around the drill tube.

Figure 5:
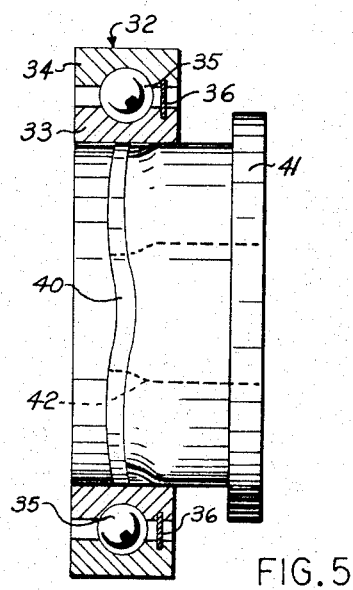
FIG. 5 is a sectional view of a roller bearing and a member of the guide assembly partially assembled therein.

The guide assembly 30 comprises a roller bearing 32 of conventional construction including inner and outer races 33, 34 having annular radially aligned grooves therein forming a race to receive a plurality of balls 35, the races being held in place by an annular keeper ring 36. The inner race 33 encloses a generally cylindrical member 37 which is preferably formed of a resilient, pliable rubber-like material resistant to lubricant, such as vinyl or urethane, and it preferably has a durometer of from 40 to 100. The outside diameter of member 37 is substantially the same as the inside diameter of race 33 so that a snug fit is effected between the member and the race. The member 37 is retained in the race 33 by a radial flange 40 at one end thereof which is of a relatively small diameter and a radial flange 41 at the opposite end which is of appreciably larger diameter. The flange 40, can be deformed along with one end of the member 37 and inserted through the race 33, as is illustrated in FIG. 5. When the member 37 is fully inserted into the race, flanges 40, 41, extend radially and in engagement with the radial surfaces of the race 33 about the opening therethrough and retain the member in position in the bearing. The flange 41 engages a relatively wide annular area of the race 33 and forms an effective seal to prevent entrance of lubricant or the like between the member 37 and the race held thereby.

The central portion of member 37 has an axial opening 42 formed therethrough which is similar in transverse cross-sectional shape to the drill rod 10 and includes a circular section having a diameter slightly less than that of the drill rod 10 and a V-shaped projection 43 which extends into one side of the opening and which corresponds in shape to the groove or flute 15 formed in the drill rod. The resilient character of the material forming member 37 permits the member to be distended so that the drill head 16 can be easily inserted therethrough after which the material will contract and closely engage the peripheral surface of the smaller diameter drill rod 10 encompassed thereby and from a lubricant tight seal and at the same time permit the drill to be reciprocated axially through the member 37.

The outer race 34 of the bearing 32 is suitably secured in an annular bushing 44 which is attached in the opening 31 of the chip box 24 so as to position the axis of the opening 42 of the guide member 37 in alignment with the axis of the opening 25 in the opposite wall of the chip box and provide a rigid support for the drill guide.

It will be seen that the guide assembly 30 provide for accurate alignment of the drill head 16 with the workpiece W to initiate the drilling and as drilling progresses with the drill tube 10 moving longitudinally into the drilled opening, the inermediate portion of the drill is restrained from whipping or bowing by the guide assembly.

In the form of the invention shown, a second whip guide assembly 45 is provided for supporting the portion of the drill tube between the spindle 12 and the guide assembly 30. The guide assembly 45 is similar to guide assembly 30 and like parts are referred to by the same reference characters. The guide assembly 45 includes the bushing 44 which is attached in an annular guide block 46 supported on the frame of the machine 11.

In the form of the invention shown, two guide assemblies for the gun drill are utilized; however, a shorter gun drill would only require one guide assembly while longer drill tubes could be supported by any suitable number of similar guide assemblies. Furthermore, the resiliency of the body 37 enables gun drills of various sizes to be inserted therethrough so that the same drill guide assemblies may be employed for several different sizes of drill tubes.

In some drilling machines, the drill rod is stationary and the work is rotated, and in that event the guide assembly of my invention may be utilized in the wall of a chip box for accurately supporting the drill tube and to seal the drill and opening against escape of lubricant and chips. Moreover, in this case, the drill will tend to vibrate even though it is not rotating and the guide assembly of the present invention may advantageously be used as a mid-span support to dampen the vibrations of the drill rod. It will also be appreciated by those skilled in the art that a guide assembly in accordance with the present invention may be advantageously utilized for this purpose even though the drill rod is not out of round or out of balance.

In the specification and claims, the known term non-round is used in referring to the drill rod. It is understood that this term is used to indicate a drill rod which is out of balance usually because of a cross section which is not entirely circular and uniform. Moreover, it will be appreciated that even if the cross section is perfectly circular, the equivalent out of balance condition will be obtained if the drill rod is out of balance because of density or some other factor and the advantages of the guide assembly may be advantageously used in this situation. The term resilient plastic has been used in the specification and it will be understood that this term encompasses elastomers which are resilient in nature and can be distended or distorted to provide a resilient gripping action.

While I have described and shown but one form of the invention, it is to be understood that other forms, modifications and adaptations could be made all falling within the scope of the claims which follow.

Having described my invention, I claim:

1. A guide for a rotatable gun drill and the like having a non-round cross section comprising, a body of resilient plastic material, and an annular rigid support means encompassing said body, said body having a non-round opening therethrough axially extending relative to said support means and the cross section thereof corresponding in form to the cross section of the drill or the like and of lesser normal dimensions whereby the drill may be projected therethrough and distend the walls of said opening so that the body resiliently grips the surfaces of the portion of the drill within said opening and rotates with said drill.

2. A guide for a gun drill and the like having a non-round cross section comprising, a body of resilient plastic material, and an annular rigid support means encompassing said body, said body having an opening therethrough axial to said support means and the cross section thereof corresponding in form to the cross section of the drill or the like and of lesser normal dimensions whereby the drill may be projected therethrough and distend the walls of said opening so that the body resiliently grips the surfaces of the portion of the drill within said opening, said support means comprising a freely rotatable bearing member.

3. A guide for a gun drill and the like having a non-round cross section comprising, a body of resilient plastic material, and an annular rigid support means encompassing said body, said body having an opening therethrough axially extending relative to said support means and the cross section thereof corresponding in form to the cross section of the drill or the like and of lesser normal dimensions whereby the drill may be projected therethrough and distend the walls of said opening so that the body resiliently grips the surfaces of the portion of the drill within said opening, said support means comprising the inner race of a ball bearing.

4. A guide for a gun drill and the like having a non-round cross section comprising, a cylindrical body of resilient plastic material, and rigid support means including an annular member encompassing said body, said body having an opening therethrough axially disposed relative to said support means and with the cross section thereof corresponding in form to the cross section of the drill or the like and of lesser normal dimensions whereby the drill may be projected therethrough and distend the walls of said opening so that the body resiliently grips the surfaces of the portion of the drill within said opening, said body including a radially extending flange at each end thereof, said flanges engaging opposite faces of said annular member.

5. A guide for a gun drill and the like having a non-round cross section comprising, a cylindrical body of resilient plastic material, and rigid support means including an annular member encompassing said body, said body having an opening therethrough axially disposed relative to said support means and with the cross section thereof corresponding in form to the cross section of the drill or the like and of lesser normal dimensions whereby the drill may be projected therethrough and distend the walls of said opening so that the body resiliently grips the surfaces of the portion of the drill within said openings, said body including a radially extending flange at each end thereof, said flanges engaging opposite faces of said annular member, one of said flanges being deformable to be received through the opening of said annular member.

6. A guide for a drill or the like as defined in claim 4 in which said annular member comprises a freely rotatable bearing member.

7. A guide or the like as defined in claim 5 in which said annular member comprises a freely rotatable bearing member.

8. A guide as defined in claim 1 in which said body has a durometer hardness of between 40 and 100.

9. In an apparatus having a gun drill or the like having a working end adapted to perform a metal cutting operation and gripped at its opposite end to securey hold and rotate the gun drill, the improvement comprising an annular rigid support means encompassing said drill intermediate its said ends, a body of resilient plastic material disposed within said annular body, said body being rotatable and having an opening therethrough receiving said drill and the normal cross section of said opening corresponding in form to the cross section of the drill and of a normal dimension smaller than the cross section of the drill whereby the drill distends the walls of said opening so that the wall grips the portion of the drill within the said opening and the body rotates with said drill.

10. A guide for a gun drill or the like which is gripped and rotated at one end comprising support means, rigid against outward expansion and having an opening extending therethrough, an insert of resilient plastic material removably received in said opening, said insert comprising a body having an opening therethrough corresponding in cross section to the gun drill to be received in the opening of the insert and of lesser normal dimension than the cross section of the gun drill whereby the drill may be projected therethrough to distend the walls of said opening so that the body resiliently grips the portion of said drill within said opening and rotates with said drill.

11. Drilling apparatus comprising, a rotatable gun drill or the like, first means gripping and supporting said drill at one end thereof, means spaced from said first means and supporting said drill intermediate the ends thereof comprising a relatively rigid member having an opening through which said drill extends, and resilient means interposed between said member and the surfaces of said drill encompassed by said member to resiliently engage said drill and rotate therewith.

12. Drilling apparatus comprising a gun drill or the like, means for gripping and rotating one end of said drill and means rotatably supporting said drill at the free end thereof, the improvement comprising means supporting said drill intermediate the ends thereof which comprises a relatively rigid member having an opening through which said drill extends, and resilient means interposed between said member and the surfaces of said drill encompassed by said member and rotatable with said drill.

13. Drilling apparatus comprising a chip box having openings in opposite walls thereof, a gun drill or the like, means supporting said drill at one end thereof with said drill extended through said openings in said chip box, means supporting said drill in one of said openings comprising a resilient means interposed between the walls of said one opening and surfaces of said drill encompassed by the walls of one opening.

14. A guide for a gun drill or the like, said guide comprising a relatively rigid annular member rotatable about its axis, means to support a drill or the like extending substantially co-axially through the opening of said member, said means having an opening for receiving a drill which extends therethrough and comprising resilient means normally tending to constrict said opening and being yieldingly deflectable to receive a gun drill inserted through said opening.

15. A guide for a gun drill or the like, said guide comprising a bearing having inner and outer races separated by revolvable members, means to support a drill or the like extending substantially co-axially through the opening of said inner race of said bearing, said means having an opening for receiving a drill therethrough and comprising resilient means normally tending to constrict said opening and being yieldingly deflectable to receive a gun drill inserted through said opening.

16. A guide for a gun drill or the like having a groove extending longitudinally in one side thereof, said guide comprising a relatively rigid annular member, means encompassed by said member for supporting a drill substantially co-axially relative to said annular member, said means having an opening for receiving the drill therethrough and comprising means normally biased inwardly from one side of said opening for yieldingly engaging the surfaces of said groove of the portion of the drill extending through said opening.

References Cited

UNITED STATES PATENTS

| | | | |
|---|---|---|---|
| 2,708,852 | 5/1955 | Wohlfahrt | 77—68 |
| 3,215,443 | 11/1965 | Irving | 77—68 X |
| 3,229,427 | 1/1966 | Goodhew | 77—68 X |

FOREIGN PATENTS

| | | |
|---|---|---|
| 1,086,864 | 8/1954 | France. |

FRANCIS S. HUSAR, *Primary Examiner.*